(No Model.)
J. J. SHEDLOCK.
PROCESS OF AND APPARATUS FOR THE TREATMENT OF ORES FOR THE EXTRACTION AND SEPARATION OF THEIR METALS.
No. 308,438. Patented Nov. 25, 1884.
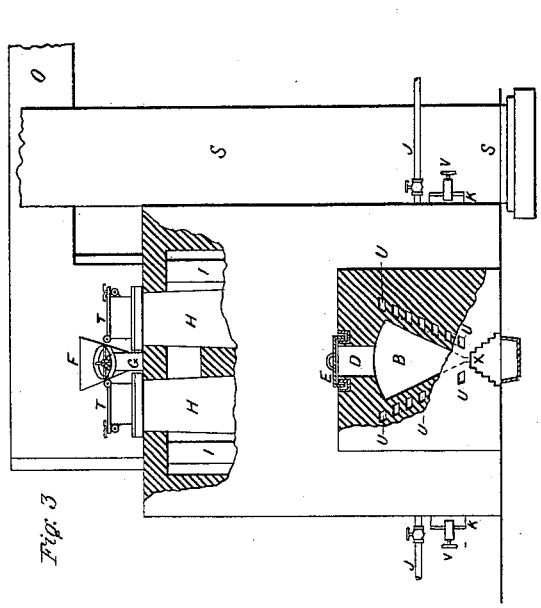
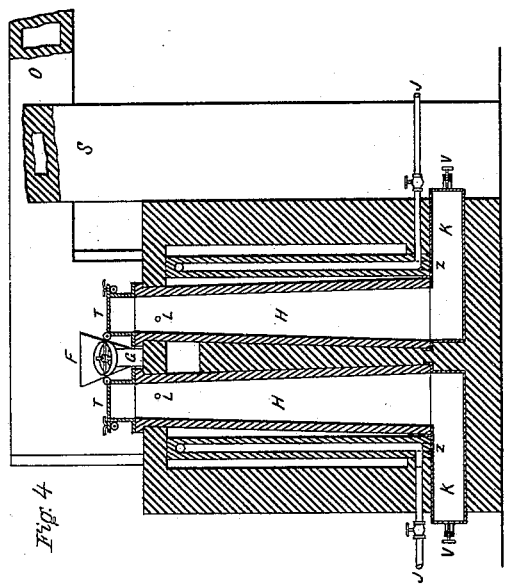
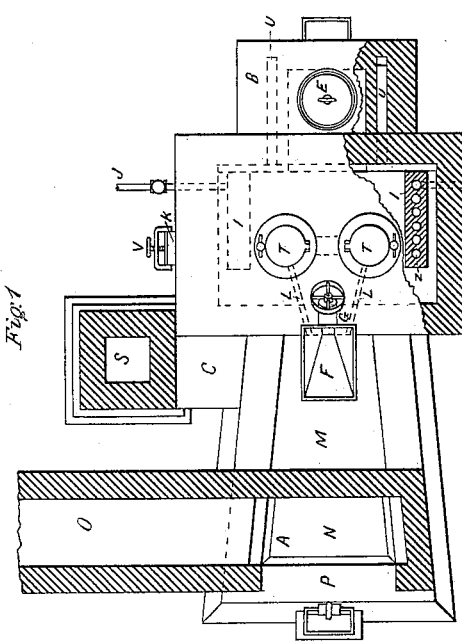
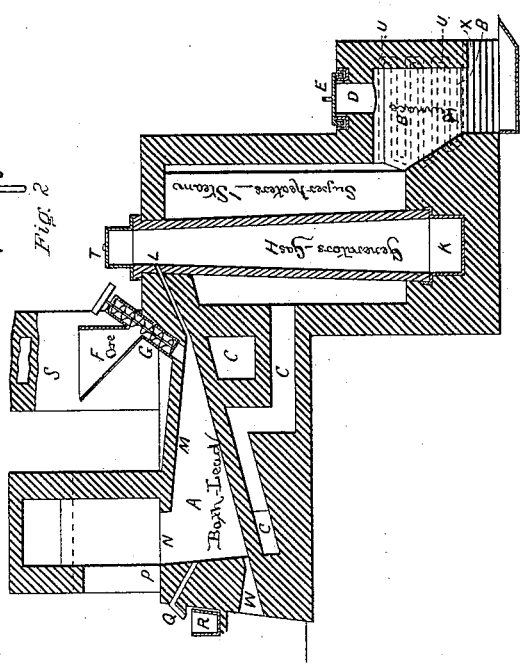
Witnesses
H. D. Williams
Chas L. Watson
James J. Shedlock
Inventor
per Alfred Shedlock
Atty.

UNITED STATES PATENT OFFICE.

JAMES JOHN SHEDLOCK, OF LONDON, ENGLAND.

PROCESS OF AND APPARATUS FOR THE TREATMENT OF ORES FOR THE EXTRACTION AND SEPARATION OF THEIR METALS.

SPECIFICATION forming part of Letters Patent No. 308,438, dated November 25, 1884.

Application filed March 17, 1884. (No model.)

*To all whom it may concern:*

Be it known that I, JAMES JOHN SHEDLOCK, a subject of the Queen of Great Britain, and a resident of London, England, have invented certain new and useful Improvements in the Process of and Apparatus for the Treatment of Ores for the Extraction and Separation of their Metals, of which the following is a specification.

My invention relating to the treatment of ores for their reduction and the extraction and separation of their metals is carried into effect by passing the ore in a finely-divided state, in combination with powdered carbon, through a bath of any suitable molten metal maintained at such a temperature as to cause it to combine readily with the free metals contained in the ore. When the ore contains metals in combination with the metalloids, it is necessary that such compounds be decomposed in order that the metals may be freed and rendered capable of uniting with the metallic bath. This is accomplished by forcing a stream of reducing-gases along with the pulverized ore through the bath of molten metal. The reducing-gases are produced by passing superheated steam through gas-generators containing materials which, at elevated temperatures, possess the property of combining with oxygen, the most economical for this purpose being those of a carbonaceous nature, the gases produced therefrom being carbonic oxide and hydrogen. These gases in a highly-heated state combine with the metalloids, thereby freeing the metals, and at the same time vaporize the volatile constituents of the ore, which, rising to the surface of the molten metal, pass off and are conveyed by flues to suitable chambers, in which the condensable portions are collected, the permanent gases being allowed to escape. The earthy and non-reducible constituents of the ore, by reason of their less specific gravity, rise to the surface of the molten metal, from whence they are easily removed, and the metals as they accumulate in the bath overflow into a receiver, from which they are from time to time withdrawn for their refinement, or at once run into ingots. If it is desired to separate the base from the noble metals without removing them from the bath, the gas-generators are filled with refractory instead of carbonaceous materials, and atmospheric air is forced through the superheaters and gas-generators, thereby becoming highly heated, in which state when passed through the bath of molten metal its oxygen combines with the oxidizable metals. The oxides of the baser metals thus formed rise to the surface and are removed, the volatile constituents of the ore escaping through the flues. The refined metal may then be removed from the bath and run into ingots or bars.

The accompanying drawings illustrate an apparatus suitable for carrying out the objects of my invention, Figure 1 being a plan partly in section; Fig. 2, a longitudinal section; Fig. 3, an elevation partly in section, and Fig. 4 a transverse section.

Similar letters of reference indicate the same parts where such parts appear in each of the figures.

The bath A has its bottom inclined downwardly from the rear to the front, and the greater part of its top is covered by a plate or slab, M, which inclines upwardly from the rear to the front, leaving an opening, N, at the front of the bath. The bath A, being filled with a suitable metal, is maintained at the required temperature by means of the heated gases from the furnace B passing first round and heating the vertical gas-generators H H and superheaters I I, and then under and round it through the flues C C C, whence they eventually escape into the chimney-shaft S. Fuel is supplied to the furnace B by the opening D, provided with a cover, E, and the oxygen necessary to support the combustion of the fuel is supplied by the atmospheric air which enters the furnace by the narrow opening at the bottom X and the channels U U, which, being formed in the sides of the furnace B, cause the air in passing through them to be heated before coming in contact with the gases produced from the fuel. The ore to be treated is supplied in a fine state of division, mixed with powdered carbon, to the hopper F, at the bottom of which is an opening which communicates with the feeding apparatus G, the screw of which, when made to revolve, carries the powdered ore into and through the bath of molten metal, A. The vertical gas-generators H H are supplied with carbonaceous or other suitable materials at the openings fitted with gas-tight covers T T. Steam from any convenient source is conveyed into the superheaters I I by the pipes and valves J J, which regulate its passage through the channels formed in the superheaters I I, from whence the steam, now raised to a high temperature, escapes by the openings Z Z into the chambers K K, and thence into the vertical gas-generators H H. The superheated steam in passing through the carbonaceous materials in the vertical gas-generators H H is decomposed, its oxygen combining with the carbon to form carbonic oxide, which, with the nascent hydrogen, passes through the gasways L L into the bath of molten metal A with the pulverized ore. The reducing-gases and pulverized ore pass along the under surface of the inclined slab or cover M toward the opening N, and in consequence of the carbonic oxide and hydrogen having a great affinity for the metalloids and some of the volatile metals they form combinations with them, and thus liberate the metals contained in the ore, allowing them to unite with the bath of molten metal, A. The gases and volatile constituents of the ore rise through the bath of molten metal, A, and escape at the opening N into the flue O, whence they are conveyed into suitable chambers, where such as are condensable are thrown down, the permanent gases being allowed to escape. The undecomposable and earthy matters of the ore, by reason of their less specific gravity, rise through the bath of molten metal, A, to the surface N, from whence they are skimmed off and removed at P. By reason of the inclination given to the slab or cover M, and the ore and gases being forced into the bath at the lower end of the cover M, the motion of the ore and gases through the molten metal is retarded, as they have to travel forward a considerable distance for a comparatively small vertical distance through the molten metal, so that the ore is kept under the influence of the heated metal and gases sufficiently long to allow of the perfect action of the gases in reducing the metal in the ore, and in causing the freed metals to be absorbed by or mixed with the molten metal in the bath.

The inclination of the cover M may be varied according to the time it is desired to keep the pulverized ore under the influence of the deoxidizing-gases and the molten metal. The metals as they accumulate in the bath A may be allowed to overflow at the spout Q, the inner mouth of which is carried so much below the surface of the metal in the bath A as to prevent any dross from passing over with the metals as they run into the receiver R, from which they are removed to undergo refinement, or at once run into ingots. When desired, the metals contained in the bath A may be refined therein. For that purpose the vertical gas-generators H H are filled with refractory materials. Atmospheric air is then forced through the pipes and valves J J into the superheaters I I, and thence through the gas-generators H H, from which the air in a highly heated state passes by the gasways L L into the bath of molten metal, A. The heated air in passing through the bath A oxidizes the baser metals, which then rise to the surface of the molten metal and are removed at the opening P, the refined metal being drawn off at the tapping-hole W and run into ingots or bars. The parts of the apparatus which are subjected to elevated temperatures must be constructed in fire clay or other refractory materials. The ash or earthy matter from the carbonaceous materials with which the vertical gas-generators H H are filled falls into and accumulates at the bottom of the chambers K K, and when necessary is removed by the doors V V.

I am aware that ores in a pulverized state have been treated for the extraction of their metals by being passed through a bath of molten metal, and also that before being submitted to the action of the molten metal ores have been calcined, heated, and agitated in a deoxidizing atmosphere.

Modifications may be made in the apparatus without departing from the essential features of my invention; but I claim as novel and therefore desire to secure by Letters Patent—

1. The improved process for separating and reducing metals from their crude ores, which consists in passing the ore in a pulverized state through a bath of molten metal, with reducing-gases which, under pressure, enter the molten metal at or near where the pulverized ore enters the same, and pass through the molten metal simultaneously therewith, substantially as set forth.

2. In a process for separating and reducing metals from their crude ores, passing the ore in a pulverized condition through molten metal with hydrogen and carbonic-oxide gases, produced by passing superheated steam through heated carbonaceous materials, and applied under pressure to the ore as it enters the molten metal, substantially as set forth.

3. In combination, a bath having an inclined top filled with a molten metal, a feeding device for forcing the pulverized ore into the molten metal at the lower end of the inclined top of the bath, and gas-generators whose outlets communicate with the bath of molten metal at or near where the pulverized ore enters the same, substantially as and for the purpose set forth.

4. In an apparatus for treating ores, in combination, the furnace B, gas-generators H, steam-superheaters I, bath A, and ore-feeder F G, substantially as set forth.

JAMES JOHN SHEDLOCK.

Witnesses:
 HY. JNO. MERRICK,
 THOS. S. SPENCE.